United States Patent
de los Reyes et al.

(10) Patent No.: US 10,943,397 B2
(45) Date of Patent: Mar. 9, 2021

(54) METHOD AND SYSTEM FOR EXPLOITING INTERACTIONS VIA A VIRTUAL ENVIRONMENT

(71) Applicant: AT&T Intellectual Property I, L.P., Atlanta, GA (US)

(72) Inventors: Gustavo de los Reyes, Fair Haven, NJ (US); Sanjay Macwan, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 520 days.

(21) Appl. No.: 15/362,401

(22) Filed: Nov. 28, 2016

(65) Prior Publication Data

US 2017/0076506 A1    Mar. 16, 2017

Related U.S. Application Data

(63) Continuation of application No. 12/329,905, filed on Dec. 8, 2008, now abandoned.

(51) Int. Cl.
| | |
|---|---|
| *G06T 19/00* | (2011.01) |
| *H04L 29/08* | (2006.01) |
| *H04L 29/06* | (2006.01) |
| *H04L 12/28* | (2006.01) |

(52) U.S. Cl.
CPC .......... *G06T 19/006* (2013.01); *H04L 12/282* (2013.01); *H04L 67/125* (2013.01); *H04L 67/38* (2013.01)

(58) Field of Classification Search
CPC ... G06F 3/0481; G06T 19/006; H04L 12/282; H04L 67/125; H04L 67/38
See application file for complete search history.

(56) References Cited

U.S. PATENT DOCUMENTS

| | | | | |
|---|---|---|---|---|
| 6,971,026 | B1* | 11/2005 | Fujiyama | G06F 21/577 705/400 |
| 7,774,440 | B1* | 8/2010 | Bagrodia | H04L 41/0816 703/1 |
| 2003/0182582 | A1* | 9/2003 | Park | H04L 63/1433 726/25 |
| 2006/0109793 | A1* | 5/2006 | Kim | H04L 41/145 370/250 |
| 2008/0222731 | A1* | 9/2008 | Dowd | H04L 63/1433 726/25 |

OTHER PUBLICATIONS

The Internet Protocol Stack, Jul. 1994, available at https://www.w3.org/People/Frystyk/thesis/Tcplp.html.*

* cited by examiner

*Primary Examiner* — Matthew Ell
(74) *Attorney, Agent, or Firm* — Guntin & Gust, PLC; Ralph Trementozzi (57) ABSTRACT

A method on a computer readable storage medium operable to store a virtual representation of a plurality of physical components, introduce a component having a predefined functionality to interact with the virtual representation and generate indications of a response of the virtual representation to the interactions of the component. A system having a memory configured to store a virtual representation of a plurality of physical components and a processor configured to introduce a component having a predefined functionality to interact with the virtual representation and generate indications of a response of the virtual representation to the interactions of the component.

20 Claims, 5 Drawing Sheets

METHOD AND SYSTEM FOR EXPLOITING INTERACTIONS VIA A VIRTUAL ENVIRONMENT

BACKGROUND

As embedded devices (e.g., any device that includes a processor, controller, micro-controller or other type of computing device) become ubiquitous in a variety of environments such as the home and the workplace, users have a desire for better interaction with such devices. One manner of providing better interaction with a variety of devices or a series of devices that are providing a specific functionality for the user (e.g., multiple devices that make up a multimedia center) is to create a virtual environment that represents the physical devices. Some of these virtual environments allow a user to control the physical devices by interacting with the virtual environment. An example of such a virtual environment is described in U.S. Provisional Patent Application 61/096,960 entitled "Method and System for Controlling Physical Components Via A Virtual Environment" filed on Sep. 15, 2008.

SUMMARY OF THE INVENTION

A computer readable storage medium storing a set of instructions that are executable by a processor, the set of instructions being operable to store a virtual representation of a plurality of physical components, introduce a component having a predefined functionality to interact with the virtual representation and generate indications of a response of the virtual representation to the interactions of the component.

A system having a memory configured to store a virtual representation of a plurality of physical components and a processor configured to introduce a component having a predefined functionality to interact with the virtual representation and generate indications of a response of the virtual representation to the interactions of the component.

DETAILED DESCRIPTION

The exemplary embodiments of the present invention may be further understood with reference to the following description and the related appended drawings, wherein like elements are provided with the same reference numerals. The exemplary embodiments of the present invention are related to systems and methods for controlling and/or interacting with a virtual environment that models physical devices and/or applications. The mechanism for interacting with the virtual environment will be referred to as an "avatar." In normal computing lexicon an avatar is a computer user's representation of himself/herself or alter ego, whether in the form of a three-dimensional model used in computer games, a two-dimensional icon used on Internet forums and other communities, or a text construct. Thus, an avatar is an "object" representing the embodiment of the user. As used throughout this description, the term "avatar" may refer to the meaning associated with the normal computing usage. However, the term "avatar" may also be used to describe a functionality that does not necessarily need to mimic a user. For example, an avatar may will be able to take advantage of special powers that the avatar enjoys by virtue of its existence in the virtual world. Examples of these special powers will be described in greater detail below.

However, prior to describing the exemplary embodiments of the avatars, an exemplary virtual environment will be described within which the avatars may be deployed. The exemplary embodiment of a virtual environment will be described with reference to a virtual environment that models a server network providing multimedia capabilities to a home environment. However, those skilled in the art will understand from the following description that the avatars may be deployed within any virtual environment.

Figure 1:
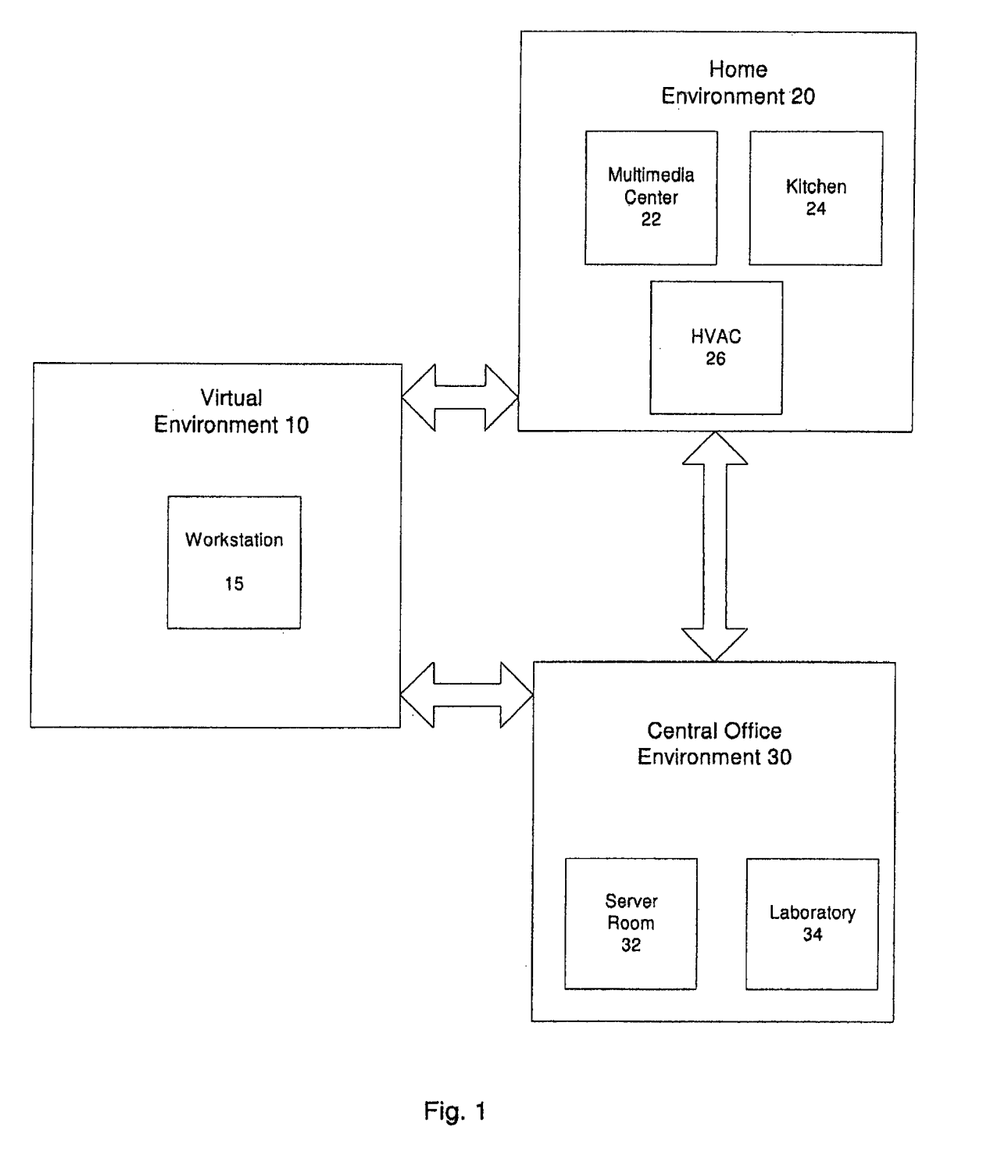
FIG. 1 shows a schematic representation of various environments according to an exemplary embodiment of the present invention.

FIG. 1 shows a schematic representation of various environments. The environments include a home environment 20 that includes a multimedia center 22, a kitchen 24 and an HVAC system 26. In this example, the home environment is discretely broken up into physical locations (e.g., multimedia center 22 and kitchen 24) or physical function (e.g., HVAC system 26) where controllable components exist. A more detailed view of the multimedia center will be provided below. However, it should be noted that the present invention is not limited to multimedia components, but may be implemented to control any physical device that is capable of being controlled (e.g., a thermostat, an oven, etc.).

Another exemplary embodiment of an environment is a central office environment 30 of a company that is distributing multimedia signals to the home environment 20. The central office environment 30 includes a server room 32 and a laboratory 34. In addition, a virtual environment 10 is also illustrated. The virtual environment 10 is illustrated as including a workstation 15. Those of skill in the art will understand that a more proper understanding of the interaction between the virtual environment 10 and the workstation 15 is that the virtual environment 10 is being executed by the workstation 15. That is, the workstation 15 may be any computing device that is capable of executing the software necessary for carrying out the functionality described herein for the virtual environment 10. For example, the computing device may be a desktop computer, server station, laptop computer, mobile computing device such as a mobile phone, etc.

As shown in FIG. 1, the central office environment 30 and the home environment 20 may exchange signals. An example of the signals may be a request from the multimedia center 22 for a particular video file (e.g., a movie) from the central office environment 30. The server room 32 of the central office environment 30 may receive the request and fulfill the request by sending the requested video signal to the multimedia center 22. In addition, in this example, it is shown that there is an interaction between the virtual environment 10 and both the home environment 20 and the central office environment 30. As will be described in greater detail below, this interaction allows a user working in the virtual environment 10 to exercise control over physical components included in the home environment 20 and/or the central office environment 30 using the interface provided by the virtual environment 10.

Figure 2:
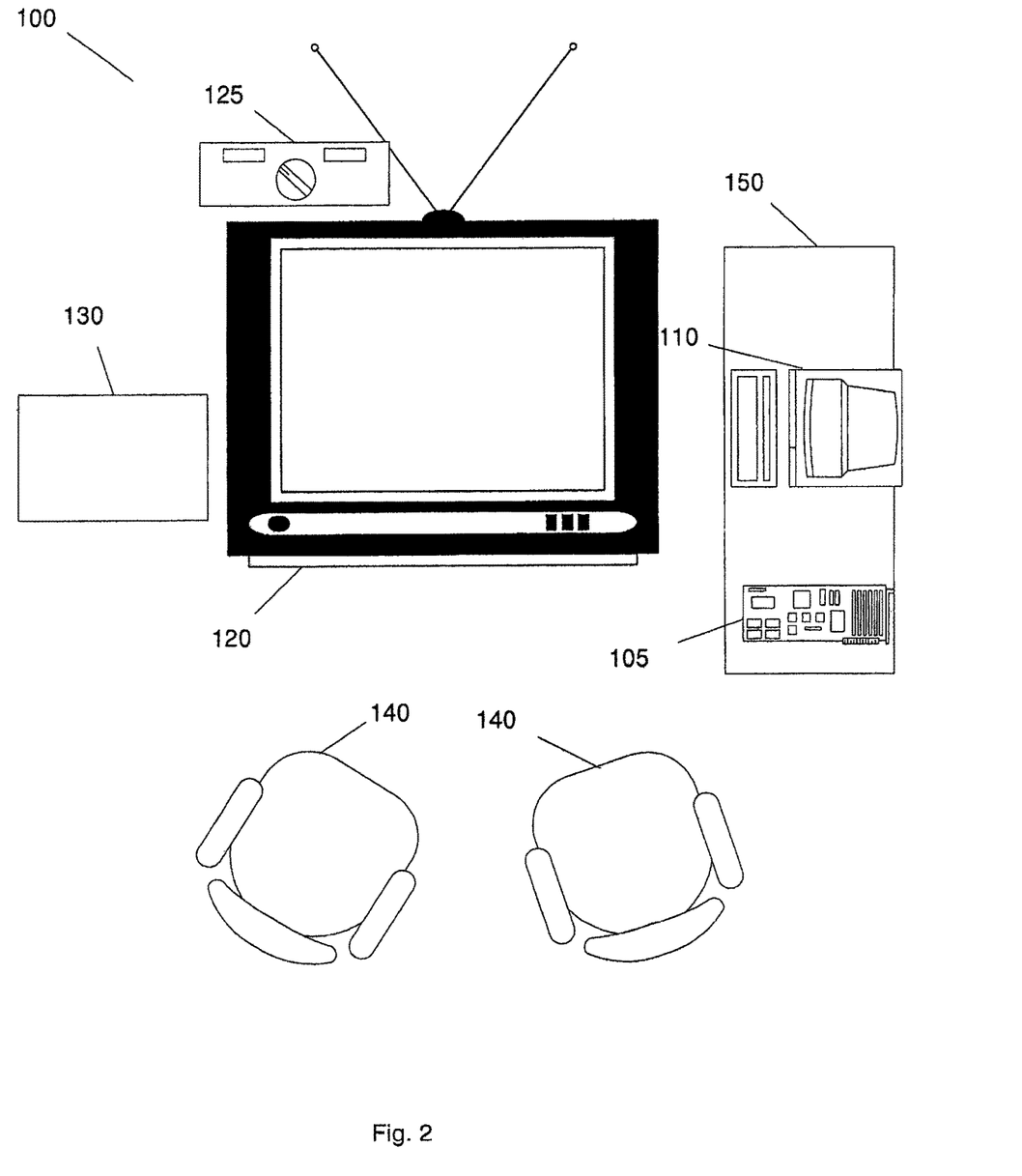
FIG. 2 shows a virtual physical view of a multimedia center of a home environment according to an exemplary embodiment of the present invention.

FIG. 2 shows a virtual physical view 100 of the multimedia center 22 of the home environment 20. The virtual physical view 100 is created in either the virtual environment 10 or in some other computing device executing a commercially available simulation or virtual world software program to model the actual multimedia center 22 of the home environment and then loaded or stored in the virtual environment 10. The virtual physical view 100 includes multimedia components such as a residential gateway 105, a computer 110, a television 120, a set top box 125 and a stereo 130. The virtual physical view 100 also includes physical entities such as chairs 140 and desk 150 to model the actual physical environment of the multimedia center 22. The physical view 100 may be a replica of the multimedia center 22 (e.g., the physical floor plan shown in the virtual physical view 100 is nearly exactly the same as the actual floor plan of the multimedia center 22) or it may be an abstract representation of the multimedia center 22 (e.g., the multimedia components may be displayed, but not in their exact locations or layouts). The user may select and build the type of physical view with which they are comfortable.

Figure 3:
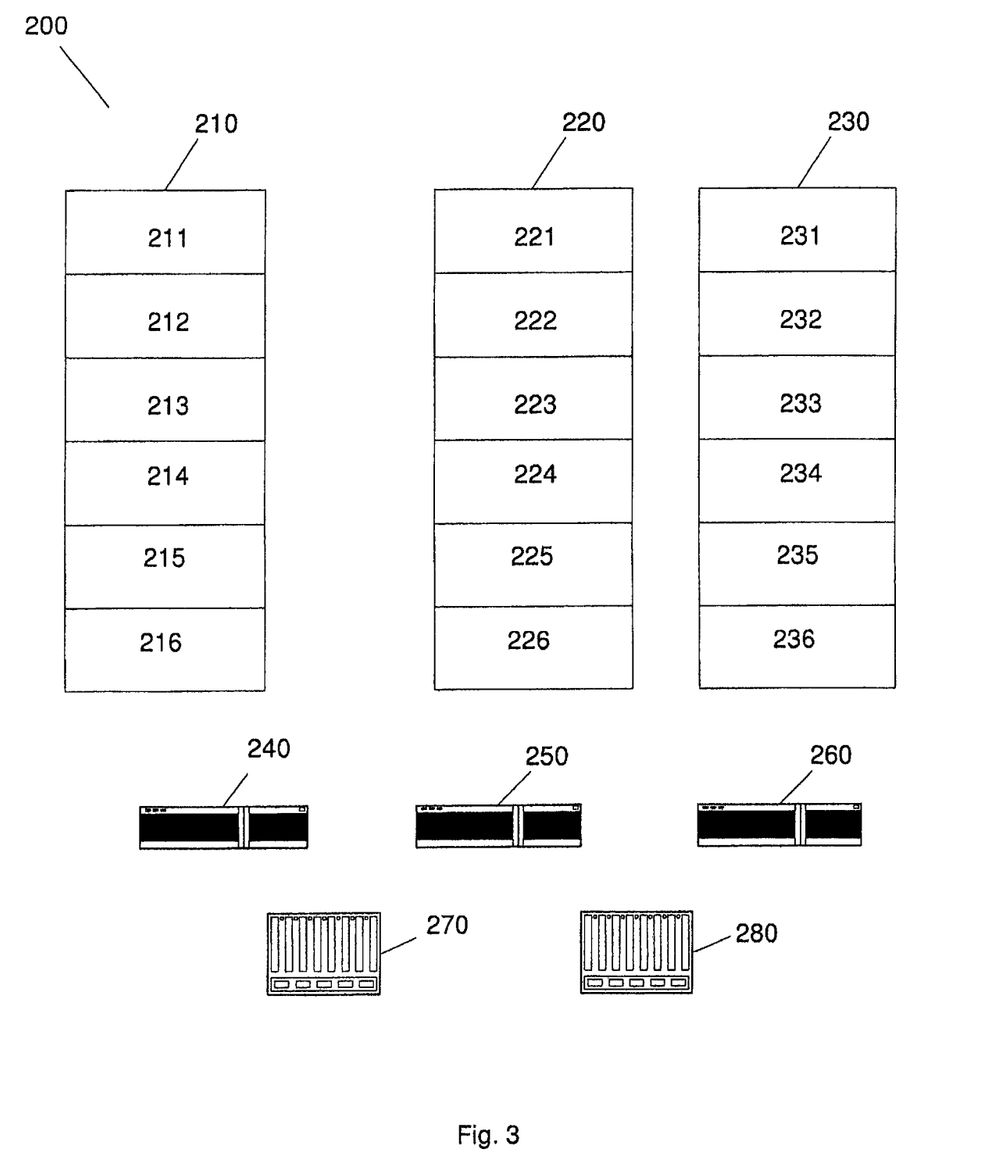
FIG. 3 shows a virtual physical view of a server room of a central office environment for generating and distributing the multimedia information destined for the multimedia center according to an exemplary embodiment of the present invention.

FIG. 3 shows a virtual physical view 200 of a server room 32 of the central office environment 30 for generating and distributing the multimedia information destined for the multimedia center 22. The physical view 200 is similar to physical view 100, except that it shows the other end of the distribution network for the multimedia information. The physical view 200 shows server rack 210 including servers 211-216, server rack 220 including 221-226 and server rack 230 including servers 231-236. The physical view 200 also includes other network components such as routers 240-260 and switches 270 and 280. As will be described in greater detail below, the components in the actual server room 32 are responsible for generating and distributing the multimedia signals that are consumed by the multimedia center of the user's home.

Figure 4:
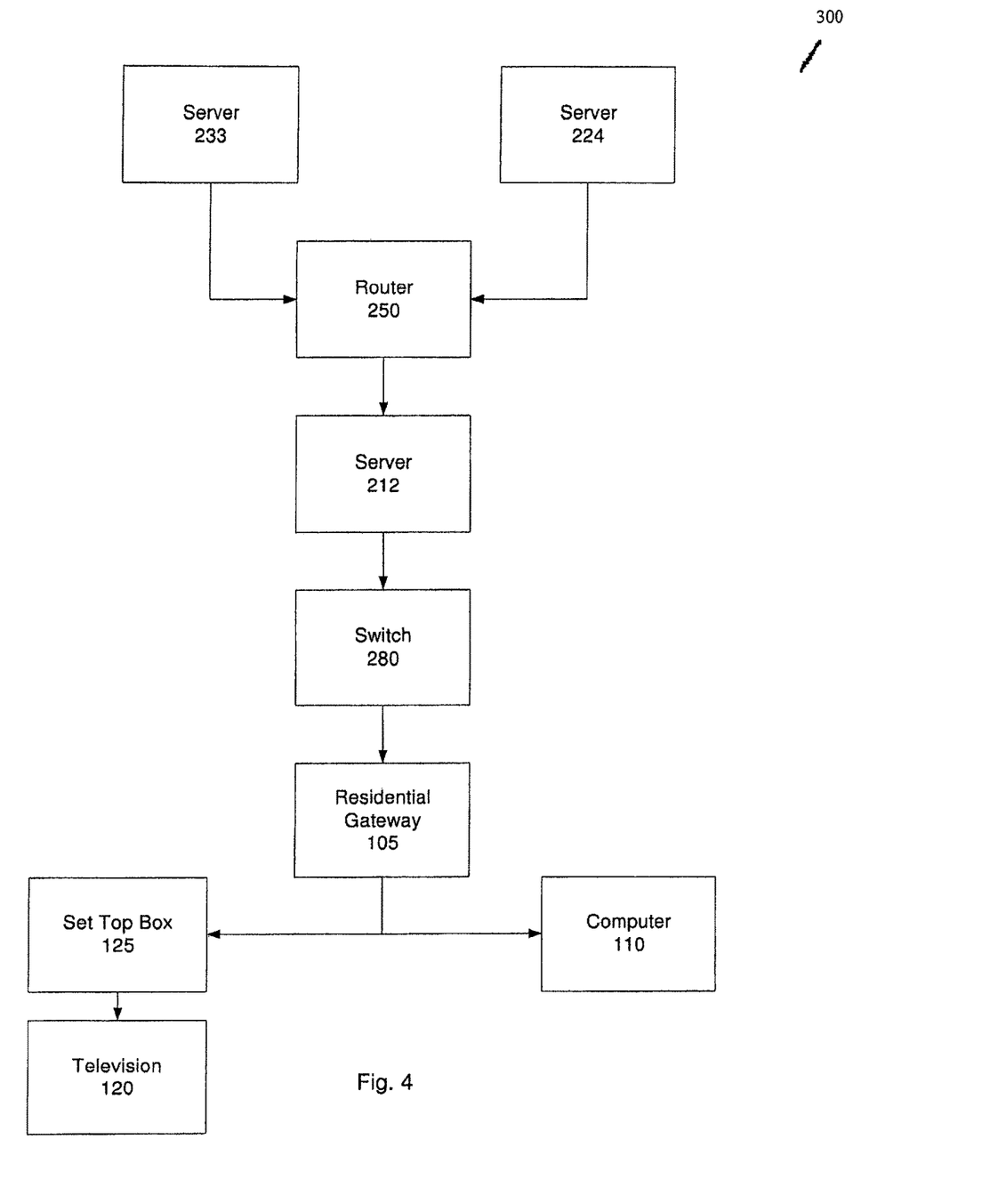
FIG. 4 shows a virtual logical view of a video distribution channel providing video from the central office environment to the multimedia center of the home environment according to an exemplary embodiment of the present invention.

FIG. 4 shows a virtual logical view 300 of a video distribution channel providing video to the multimedia center 22. In this exemplary embodiment, the video distribution channel includes servers 233 and 224 (or applications on the servers 233 and 224) that generate the video to be distributed, router 250 that receives the video signal from servers 233 and 224 and routes it to server 212 that is responsible for distribution of the video signal. The video signal is then sent through switch 280 to residential gateway 105 for distribution to the computer 110 and/or the television 120 via set top box 125. Those skilled in the art will understand that the virtual logical view 300 is only exemplary and that many different logical views may be built to model the distribution of many different types of signals. Thus, there may be many types of logical views that are created and stored in the virtual environment 10. In addition, the logical view 300 may not include all the components in the video distribution channel. For example, between the switch 280 that is in server room 280 and residential gateway 105, there may be other network components such as additional servers, routers, switches, repeaters, etc. Again, the user may build the virtual logical view in any manner that the user is comfortable interacting with the view.

The following will provide an example of the use of the virtual views 100-300 and a user's interaction with the virtual views 100-300. In this example, the user may be considered to be a person associated with the entity that is distributing the multimedia signals who is responsible for security applications. In this example, the user is attempting to run a test that is designed to disrupt the video signal that is being distributed to the multimedia center 22 of the home environment 20. Accordingly, the user may select the video distribution channel virtual logical view 300 from a list of virtual logical views.

Once the logical view 300 for the video distribution channel is selected, the virtual environment 10 will display the virtual logical view 300 to the user. In addition, the one or both of the virtual physical views 100 and 200 may also be displayed. For example, the virtual environment 10 may include multiple displays or multiple display panes to display multiple virtual views. The physical virtual views 100 and 200 may be correlated to the virtual logical view 300. For example, the boxes illustrating the various components of the virtual logical view 300 may be outlined in a specific color. The components illustrated in the virtual physical views 100 and 200 may be colored in the same manner to illustrate the components that are involved in the selected logical view 300. However, it should be noted that two views (e.g., the physical view and the logical view) are not required. For example, a user may be comfortable with only the physical view or the logical view and it may not be necessary to show the other view in the virtual environment 10.

As described above, there is an actual physical connection between the virtual environment 10 (e.g., the workstation 15 executing the virtual environment 10) and the physical components modeled by the virtual views 100-300. Thus, when the user selects the video distribution channel logical view 300, the virtual physical view 100 may show the video signal on the television 120 or computer 110 that is actually being displayed on the television screen or computer screen in the home environment 20.

The components illustrated in the virtual environment 10 may have various functionalities associated with the components that the user may select to perform. The associated functionalities may be selected, for example, using a drop-down menu associated with the component (displayed in either the physical views 100 and 200 or logical view 300). For example, the server 233 may be generating a first video stream and the server 224 may be generating a second video stream. A user, by selecting on of the servers 233 and 224, may be able to toggle the video stream that is being displayed on the television screen 120. As noted above, this control is exerted both in the virtual environment (e.g., what is being displayed on the television 120 screen of virtual physical view 100) and on the actual television screen in multimedia center 22.

Thus, as can be seen from the above example, the virtual environment 10 may be used to allow a user to interact and exert control over components in the real world environment. This integrating of the virtual environment 10 with the real world environment may lead to many unforeseen interactions and consequences. The creation of avatars that can "roam" freely within the virtual environment 10 may be used by a system developer, system administrator, etc. to explore these interactions in the virtual environment 10 to determine both the capabilities and vulnerabilities of the components within the real world environment.

The following will provide examples of the use of avatars within the exemplary virtual environment 10. It should be noted that the exemplary avatars will be used to produce security exploits to, for example, lead to new security mechanisms. However, the avatars do not need to be limited to security applications, but may be used for any type of functionality that may be deployed or tested for a real world environment network or component, such as provisioning, network throughput, troubleshooting, etc.

A first exemplary avatar may appear to the virtual environment 10 as an Internet Protocol ("IP") packet that will be able to "flow" through a system from end-to-end. As it goes through each element, it will be able to morph into the correct packet that will enable it to pass through any security checkpoints, such as firewalls, and reach its destination. At that point, it may be able to "own" the destination system by exploiting other vulnerabilities.

For example, a user may select the virtual logical view 300 shown in FIG. 4 and select to inject the IP packet avatar into the server 233. The IP packet avatar may then flow to the router 250, the server 212, the switch 280, the residential gateway 105 and each of the computer 110 and the set top box 125. As described above, as the IP packet avatar was flowing through the system, the IP packet avatar could morph into the correct configuration to pass through each device. That is, the model of the devices in the virtual environment 10 will include the same functionalities as the actual devices that the virtual environment 10 is modeling. Thus, the virtual components will process IP packets in the same manner as the actual devices. Those skilled in the art will understand that each component will process an IP packet in accordance with the protocol stack included in the device. Each layer of a protocol stack will strip away various information from the IP packet to process the specific functionality associated with the layer so that the IP packet may then be repackaged and forwarded to the next device along the path to the final destination. The layers of different devices may require different information to continue to process an IP packet. For example, the residential gateway 105 may include a firewall to exclude malicious IP packets from entering the devices' residence. The firewall is looking for specific information in each IP packet to allow the IP packet to enter the residence. The IP packet avatar will have the ability to mimic any of this information in order to pass through each of the devices. Then, when the IP packet avatar reaches the final destination (e.g., the computer 110), the IP packet avatar would now be able to exploit any security vulnerabilities of that destination device. Thus, a user can inject the IP packet avatar to determine what security breaches a malicious IP packet can exploit in the system.

Another example of an avatar is a monitoring avatar that can monitor the virtual environment 10 for signs of the malicious avatars such as the above described IP packet avatar or other misbehaving avatars. The monitoring avatar may also include the functionality to respond to the malicious avatars in order to protect the system. Thus, in this manner a user may implement an attack on the system with one or more malicious avatars and determine whether the monitoring avatars are able to identify the malicious avatars and take the proper corrective action to protect against the malicious avatars. Again, in this manner, a user who is attempting to protect the physical components of the network can launch a variety of attacks in the virtual environment 10 to determine if the network security measures implemented in the actual network and devices (as modeled by the monitoring avatar in the virtual environment 10) can protect against the various attacks without having to launch an actual attack against the physical network.

As described above, the user can launch a variety of attacks within the virtual environment 10 using different avatars. A basic attack avatar may embody any known attack that can be used within a network. Examples may include denial of service attacks, eavesdropping, data modification, IP spoofing, sniffer attacks, etc. The basic attack avatar may be modified as new types of attacks are developed allowing a user to launch attacks within the virtual environment 10 to continuously assess the vulnerability of the actual network.

Another example of an attack avatar may be a social engineering avatar. The social engineering avatar may launch an attack in the virtual environment 10, for example, by interacting with other avatars. Social engineering attacks are those aimed to get proprietary information by conning others. Thus, a user can launch the social engineering avatar to interact with other avatars to determine the types of attacks to which other users are vulnerable. For example, the social engineering avatar may engage another user's avatar in a chat session and ask a series of questions aimed at obtaining private information from the other user. The social engineering avatar may then provide the user that launched the attack information on the effectiveness of certain techniques to obtain user's private information. The social engineering avatar may also be able to use the user's private information to launch other attacks.

Another example of an avatar may be a discontinuity avatar that continuously probes the virtual environment 10 in search of discontinuities that may be exploitable. For example, this avatar can automatically walk the entire virtual environment 10 while "clicking" or otherwise exercising its powers in order to determine if there is an unexpected response. Any unexpected response may indicate a software bug that may be exploitable. This avatar will especially probe the edges of the world where there may be programming discontinuities. A special case of the discontinuity avatar may be able to "see" everything in the virtual environment 10. It will use its powers of teleporting its vision in order to get into secure areas to carry out security exploits.

A final exemplary avatar may be a self-developing avatar. This avatar will increase in knowledge by virtue of its interaction with other avatars and with the virtual environment 10. It will develop independently of its "master" in the real world environment. It will learn the tricks of hacking the virtual environment 10 just as real-world hackers learn their trade. This self-developing avatar could turn out to be the most powerful avatar because it may exhibit the most unpredictable behavior.

Those skilled in the art will understand that the above avatars are only exemplary and that many different avatars having many different types of functionalities within the virtual environment may be developed. The integrating of the virtual environment with the real world environment will lead to many unforeseen interactions and consequences. The interaction between the virtual environment and the real world environment and the creation of avatars that can be exercised extensively to explore some of the many interactions will result in allowing users to better understand the real world environment possibilities of the network, both potential problems and potential benefits. For example, the results may be used to explore new attacks and then help us design new security mechanisms that are effective without unduly constraining creativity.

Figure 5:
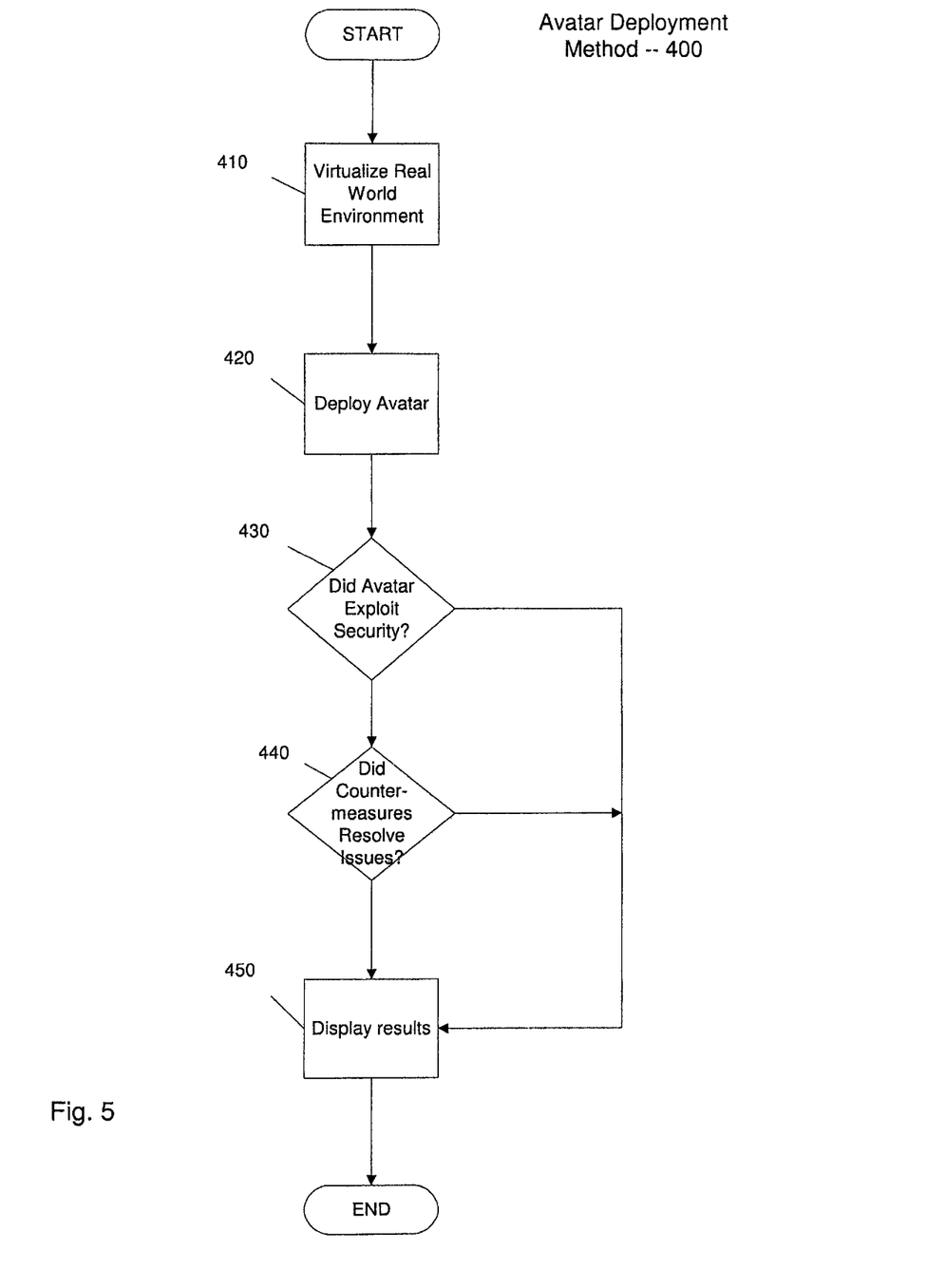
FIG. 5 provides an exemplary method showing the deployment of an avatar within a virtual environment according to an exemplary embodiment of the present invention.

FIG. 5 provides an exemplary method 400 showing the deployment of an avatar within the virtual environment 10. Again, the exemplary avatar being deployed is shown as a security related avatar, but this is only exemplary. In step 410, the real world environment is virtualized to create the virtual environment 10. In step 420, the exemplary avatar is deployed within the virtual environment 10. The avatar will then perform its functionality. For example, if the deployed avatar is the IP packet avatar, the avatar will perform according to the description of such an avatar described above.

In step 430, it is determined whether the avatar exploited any security issues within the virtual environment. For example, was the IP packet avatar able to access a user's environment and gain access to a user's component. In another example, it may be determined if the social engineering avatar was able to obtain a user's private information. If the avatar is not able to exploit any security issues in step 430, the results may be displayed to the user in step 450. The results in such a case may simply be that the avatar has been deployed, but that it has not been able to cause any problems within the virtual environment 10.

If the avatar is able to exploit a security issue in step 430, this information may also be displayed to the user in step 450. The display may show the user, for example, the type of vulnerability that the avatar exploited or the type of successful attack launched by the avatar. In addition, the method may continue to step 440 to determine if any countermeasures deployed in the network can resolve the issue created by the avatar. For example, if the avatar is a basic attack avatar that launches a denial of service attack, the network may include countermeasures such as blocking traffic from certain IP address or range of address, disconnecting offending nodes or edge devices of the network, etc. to combat such an attack. In step 440, it is determined if these countermeasures are successful or if there are any countermeasures that were attempted to deal with the issue. If the countermeasures are successful, the results are displayed to the user in step 450. For example, the display may indicate the type of countermeasure that was used and how it mitigated the attack. If the countermeasure was unsuccessful or not deployed at all, the display may indicate this information and may also indicate a potential type of countermeasure that may be used.

It should be noted that once an avatar is deployed within the virtual environment 10, it may remain active for extended periods of time waiting to exploit vulnerabilities within the network as the network is changed, e.g., new hardware is added, new applications are added, etc. In addition, as noted multiple times above, security type avatars are not the only type of avatars that may be deployed within the virtual environment. For example, there may be an avatar that is related to network routing that runs through various network routing scenarios based on different network loadings and other factors to determine a best route for packets within the network. This avatar may run constantly in the virtual environment and the results may be used to alter the routing tables of routing devices in the real world environment. Thus, the deployment method for different avatars may be different depending on the functionality provided by the avatars.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A non-transitory computer readable storage medium including a set of instructions that, when executed by a processor, cause the processor to perform operations, the operations comprising:

storing a virtual environment that includes a virtual representation of a plurality of physical components, wherein a real world environment comprises the plurality of physical components, wherein the plurality of physical components comprises a physical video display, wherein the virtual representation of the plurality of physical components comprises a virtual video display, and wherein the virtual representation includes a replication of a physical layout of each of the plurality of physical components relative to one another in the real world environment;

introducing an object into the virtual environment having a predefined functionality to interact with the virtual environment, wherein the object is an avatar that continuously assesses a first type of vulnerability associated with the virtual environment, wherein the avatar remains active to continuously assess the first type of vulnerability as one of new physical components are added to the real world environment or configuration changes are made to one or more of the plurality of physical components; and allowing a user to exert control over the plurality of physical components in the real world environment using the virtual environment, the control comprising selection by the user of a selected video signal from among a plurality of video signals and the control further comprising causing presentation of the selected video signal on the physical video display along with a corresponding presentation of the selected video signal on the virtual video display.

2. The non-transitory computer readable storage medium of claim 1, wherein the operations further comprise:

introducing a further object into the virtual environment having a further predefined functionality to interact with the virtual environment, wherein the further object is a further avatar that continuously assesses a second type of vulnerability associated with the virtual environment.

3. The non-transitory computer readable storage medium of claim 1, wherein the first type of vulnerability corresponds to an IP packet and wherein the avatar is an IP packet avatar that interacts with each virtual representation of the plurality of physical components, wherein prior to interacting with each virtual representation of the plurality of physical components the IP packet avatar alters a configuration of the IP packet avatar into a type of configuration that allows the IP packet avatar to be processed by each virtual representation of the plurality of physical components without being prohibited by a security measure when the IP packet avatar interacts with each virtual representation of the plurality of physical components.

4. The non-transitory computer readable storage medium of claim 1, wherein the operations further comprise:

configuring, for display, data that corresponds to the first type of vulnerability associated with the virtual environment.

5. The non-transitory computer readable storage medium of claim 1, wherein the first type of vulnerability corresponds to proprietary information and the avatar is a social engineering avatar that provides a series of questions to a further avatar that are formulated to obtain the proprietary information.

6. The non-transitory computer readable storage medium of claim 1, wherein the first type of vulnerability corresponds to discontinuities within the virtual environment and wherein the avatar is a discontinuity avatar that interacts with an entirety of the virtual environment, excluding any further avatars within the virtual environment, to determine any discontinuities within the virtual environment, wherein the discontinuities include an occurrence of an unexpected response by the virtual environment.

7. The non-transitory computer readable storage medium of claim 1, wherein the avatar is a self-developing avatar that interacts with an entirety of the virtual environment and any further avatars within the virtual environment and wherein the self-developing avatar determines a procedure to exploit the first type of vulnerability associated with the virtual environment based on interactions of the self-developing avatar.

8. The non-transitory computer readable storage medium of claim 1, wherein the operations further comprise:
   determining a countermeasure that mitigates the first type of vulnerability within the virtual environment; and
   executing the countermeasure.

9. The non-transitory computer readable storage medium of claim 8, wherein the operations further comprise:
   configuring, for display, a type of the countermeasure that was executed and data associated with a procedure that corresponds to the countermeasure.

10. The non-transitory computer readable storage medium of claim 3, wherein the type of configuration corresponds to an IP protocol stack of the virtual representation of the plurality of physical components.

11. A system, comprising:
    a memory that includes a virtual environment comprising a virtual representation of a plurality of physical components and a set of instructions, wherein a real world environment comprises the plurality of physical components, wherein the plurality of physical components comprises a physical video display, wherein the virtual representation of the plurality of physical components comprises a virtual video display, and wherein the virtual representation includes a replication of a physical layout of each of the plurality of physical components relative to one another in the real world environment; and
    a processor that executes the set of instructions to perform operations, the operations comprising:
       introducing an object into the virtual environment having a predefined functionality to interact with the virtual environment, wherein the object is an avatar that continuously assesses a first type of vulnerability associated with the virtual environment, wherein the avatar remains active to continuously assess the first type of vulnerability as one of new physical components are added to the real world environment or configuration changes are made to one or more of the plurality of physical components; and
       allowing a user to exert control over the plurality of physical components in the real world environment using the virtual environment, the control comprising selection by the user of a selected video signal from among a plurality of video signals and the control further comprising causing presentation of the selected video signal on the physical video display along with a corresponding presentation of the selected video signal on the virtual video display.

12. The system of claim 11, wherein the operations further comprise:
    introducing a further object into the virtual environment having a further predefined functionality to interact with the virtual environment, wherein the further object is a further avatar that continuously assesses a second type of vulnerability associated with the virtual environment.

13. The system of claim 11, wherein the first type of vulnerability corresponds to an IP packet and wherein the avatar is an IP packet avatar that interacts with each virtual representation of the plurality of physical components, wherein prior to interacting with each virtual representation of the plurality of physical components the IP packet avatar alters a configuration of the IP packet avatar into a type of configuration that allows the IP packet avatar to be processed by each virtual representation of the plurality of physical components without being prohibited by a security measure when the IP packet avatar interacts with each virtual representation of the plurality of physical components.

14. The system of claim 11, wherein the first type of vulnerability corresponds to proprietary information and the avatar is a social engineering avatar that provides a series of questions to a further avatar that are formulated to obtain the proprietary information.

15. The system of claim 11, wherein the first type of vulnerability corresponds to discontinuities within the virtual environment and wherein the avatar is a discontinuity avatar that interacts with an entirety of the virtual environment, excluding any further avatars within the virtual environment, to determine any discontinuities within the virtual environment, wherein the discontinuities include an occurrence of an unexpected response by the virtual environment.

16. The system of claim 11, wherein the avatar is a self-developing avatar that interacts with an entirety of the virtual environment and any further avatars within the virtual environment and wherein the self-developing avatar determines a procedure to exploit the first type of vulnerability associated with the virtual environment based on interactions of the self-developing avatar.

17. The system of claim 11, wherein the operations further comprise:
    determining a countermeasure that mitigates the first type of vulnerability within the virtual environment; and
    executing the countermeasure.

18. The system of claim 11, wherein the avatar is a network routing avatar that determines an alternate routing table for the plurality of physical components in the real world environment based on processing, in the virtual environment, a plurality of network routing scenarios that correspond to a plurality of network loads.

19. The system of claim 11, wherein the avatar operates continuously throughout execution of the virtual environment.

20. A method, comprising:
    storing, by a processing system including a processor, a virtual environment that includes a virtual representation of a plurality of physical components, wherein a real world environment comprises the plurality of physical components, wherein the plurality of physical components comprises a physical video display, wherein the virtual representation of the plurality of physical components comprises a virtual video display, and wherein the virtual representation includes a replication of a physical layout of each of the plurality of physical components relative to one another in the real world environment;
    introducing, by the processing system, an object into the virtual environment having a predefined functionality to interact with the virtual environment, wherein the object is an avatar that continuously assesses a first type of vulnerability associated with the virtual environment, wherein the avatar remains active to continuously assess the first type of vulnerability as one of new physical components are added to the real world environment or configuration changes are made to one or more of the plurality of physical components; and allowing, by the processing system, a user to exert control over the plurality of physical components in the real world environment using the virtual environment, the control comprising selection by the user of a selected video stream from among a plurality of video streams and the control further comprising causing presentation of the selected video stream on the physical video display along with a corresponding presentation of the selected video stream on the virtual video display.

\* \* \* \* \*